United States Patent [19]

d'Alayer de Costemore d'Arc

[11] Patent Number: 4,682,320
[45] Date of Patent: Jul. 21, 1987

[54] POWER-OPERATED DEVICE FOR ASSISTING LOADING AND UNLOADING A DISC PLAYER

[75] Inventor: Stéphane A. M. d'Alayer de Costemore d'Arc, Genappe, Belgium

[73] Assignee: Staar S. A., Belgium

[21] Appl. No.: 768,562

[22] Filed: Aug. 23, 1985

[30] Foreign Application Priority Data

Mar. 14, 1985 [BE] Belgium .............................. 0/214648

[51] Int. Cl.$^4$ ............................................. G11B 25/04
[52] U.S. Cl. ..................................... 369/77.1; 369/194
[58] Field of Search ................... 369/38, 39, 77.1, 194

[56] References Cited

U.S. PATENT DOCUMENTS

| | | | |
|---|---|---|---|
| 4,507,769 | 3/1985 | Fukumitsu | 369/77.2 |
| 4,513,409 | 4/1985 | Staar | 369/77.1 |
| 4,523,306 | 6/1985 | Staar | 369/77.1 |
| 4,561,078 | 12/1985 | Nakayama | 369/38 |
| 4,567,584 | 1/1986 | Kawakami | 369/38 |

Primary Examiner—Steven L. Stephan
Attorney, Agent, or Firm—Leydig, Voit & Mayer

[57] ABSTRACT

A power-driven apparatus for assisting in loading and unloading a disc into a player or recording apparatus comprising a housing for receiving and supporting the disc, a power-operated movable roller driven by a motor to rotate the disc and a movable detector for energizing the motor for guiding the disc into and out of the housing of the player. The edge of the disc is engaged by the roller which positively rolls the disc along an entrance surface, the roller and entrance surface being covered by a material having a high coefficient of friction so that the roller positively rolls the disc both into and out of the apparatus to assist in the loading and unloading.

7 Claims, 6 Drawing Figures

POWER-OPERATED DEVICE FOR ASSISTING LOADING AND UNLOADING A DISC PLAYER

TECHNICAL FIELD

The present invention relates to an improvement in disc player and recorder apparatus and, more particularly, to a power-driven device for assisting in the operations of loading and unloading a disc in disc player or recorder apparatus.

BACKGROUND ART

To initiate playing or recording, a disc is inserted into an entrance slot of a slot-type disc player or recorder apparatus and mechanical guiding means are provided to bring the disc into its playing or recording position. The playing or recording position is usually on a drive hub and in a plane parallel to the insertion plane. Hereinafter, for convenience, reference is made to "playing" a disc but it will be understood that "playing" also includes "recording".

When playing is completed or the user does not wish the playing to continue, the disc is unloaded from the hub and ejected out of the slot. In conventional player apparatus, the distance that the disc is displaced by the apparatus is relatively short and limited both during the loading and unloading operations. In both cases, the user needs to manually insert the disc deep into the entrance slot when loading and is required to manually pull the disc from a substantial depth in the entrance slot when unloading. As can be seen, the conventional disc player apparatus requires assistance from the user when changing discs, which may be inconvenient and undesirable and, furthermore, the disc may be damaged during its transition because of user-handling.

It would be desirable in some applications of player apparatus for the disc to be ejected almost the full extent of the disc and to draw the disc into the apparatus so that, with the manual apparatus, the handling of the disc is minimized and, in automatic apparatus, such as disc changer apparatus, the disc may be more easily and readily transferred to and from a storage magazine adjacent the player apparatus.

DISCLOSURE OF THE INVENTION

It is, therefore, an object of the present invention to eliminate the deficiencies described above and to provide a power-driven device for assisting in the loading and unloading of a disc in a slot-type disc player apparatus.

Figure 1:
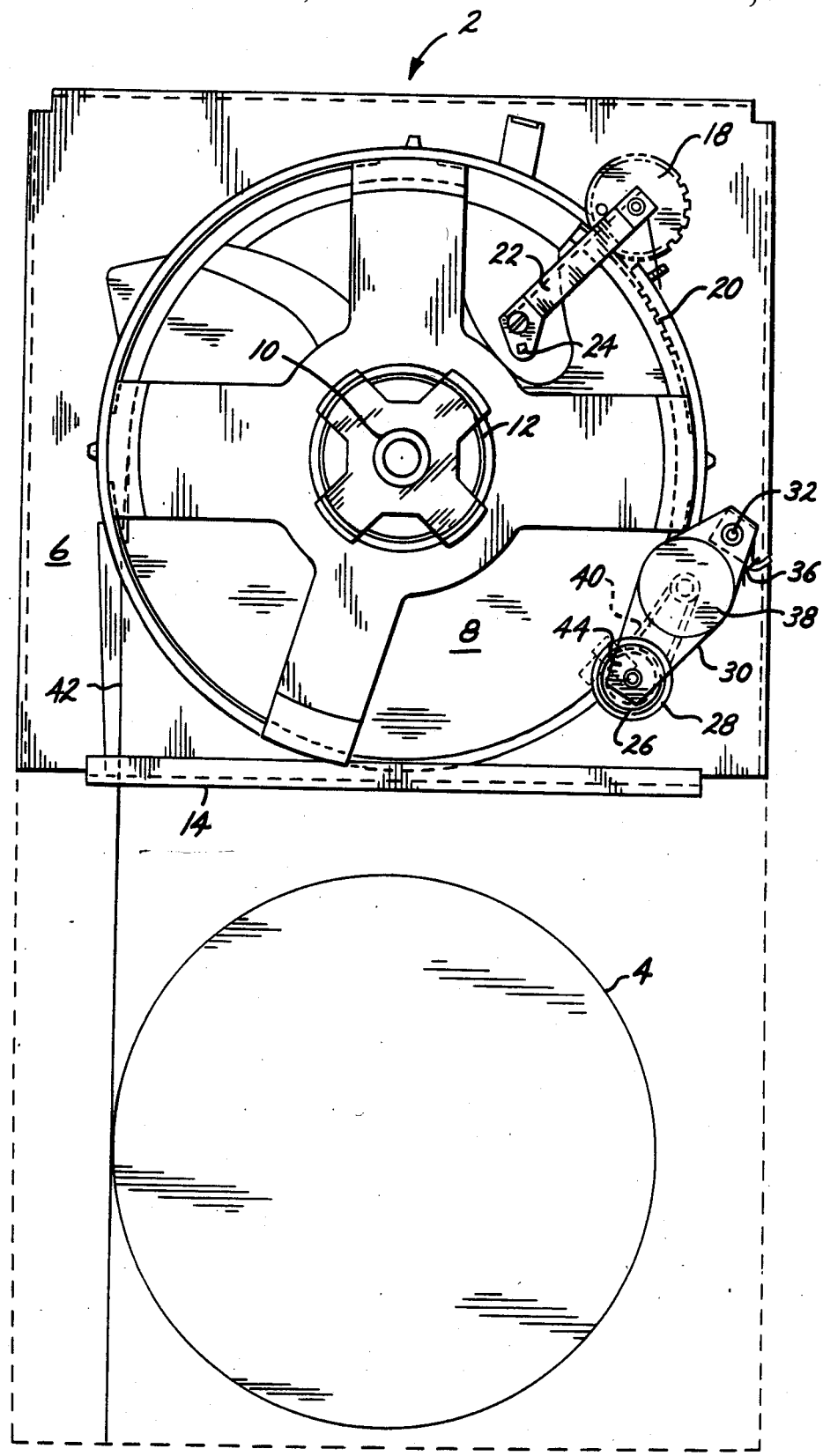
FIG. 1 is a fragmentary side elevation of a disc player apparatus of the present invention having the improved power-driven roller apparatus for assisting in the loading and unloading operations.

Best Mode For Carrying Out The Invention:

Turning to FIG. 1, a disc player apparatus 2 is shown having a helicoidal loading and unloading apparatus for a disc of the type described in U.S. Pat. No. 4,513,409 and in U.S. patent application Ser. No. 687,023, filed Dec. 28, 1984. The latter pending application describes an automatic changer apparatus associated with a loading and unloading apparatus for selectively playing a disc and having a storage magazine for a plurality of discs which may be removed from the magazine and transferred to the player apparatus and then returned. As shown in FIG. 1, a disc 4 is positioned outside the player apparatus 2 and may then be inserted into the apparatus 2 manually or by automatic means.

The player apparatus 2 has a housing 6 within which is mounted a helicoidally movable disc support 8 having an associated drive hub 10 and clamp 12. A disc 4 is movable in its own plane edgewise through a slot 14 to the disc support 8 which is rotationally mounted and simultaneously movable in a helicoidal path, as fully explained in U.S. Pat. No. 4,513,409, to shift a disc 4 from the plane in which it is inserted to a spaced plane in which it is held on the drive hub 10 by the clamp 12 for rotation at playing speed. The helicoidal movement of the disc support 8 is guided by ramps on a fixed ring 16 and the rotary movement of the disc support 8 is produced by a motor (not shown) driving a gear wheel 18 which meshes with a gear sector 20 carried by the edge of the disc support 8.

An arm 22, preferably fitted with an optical detector 24 and mounted to be rotated by the drive gear 18 for the disc support 8, is engaged by the edge of the disc 4 and guides the disc 4 to a playing position when the disc 4 is inserted during a loading operation. The pivoting arm 22 also operates to displace the disc 4 initially from its playing position during an unloading operation. A disc 4 is shown in position outside the player apparatus 2 in FIG. 1, ready to be inserted into the apparatus 2, while FIG. 2 shows a disc 4 partially inserted into the apparatus 2 at the start of the loading operation.

Figure 2:
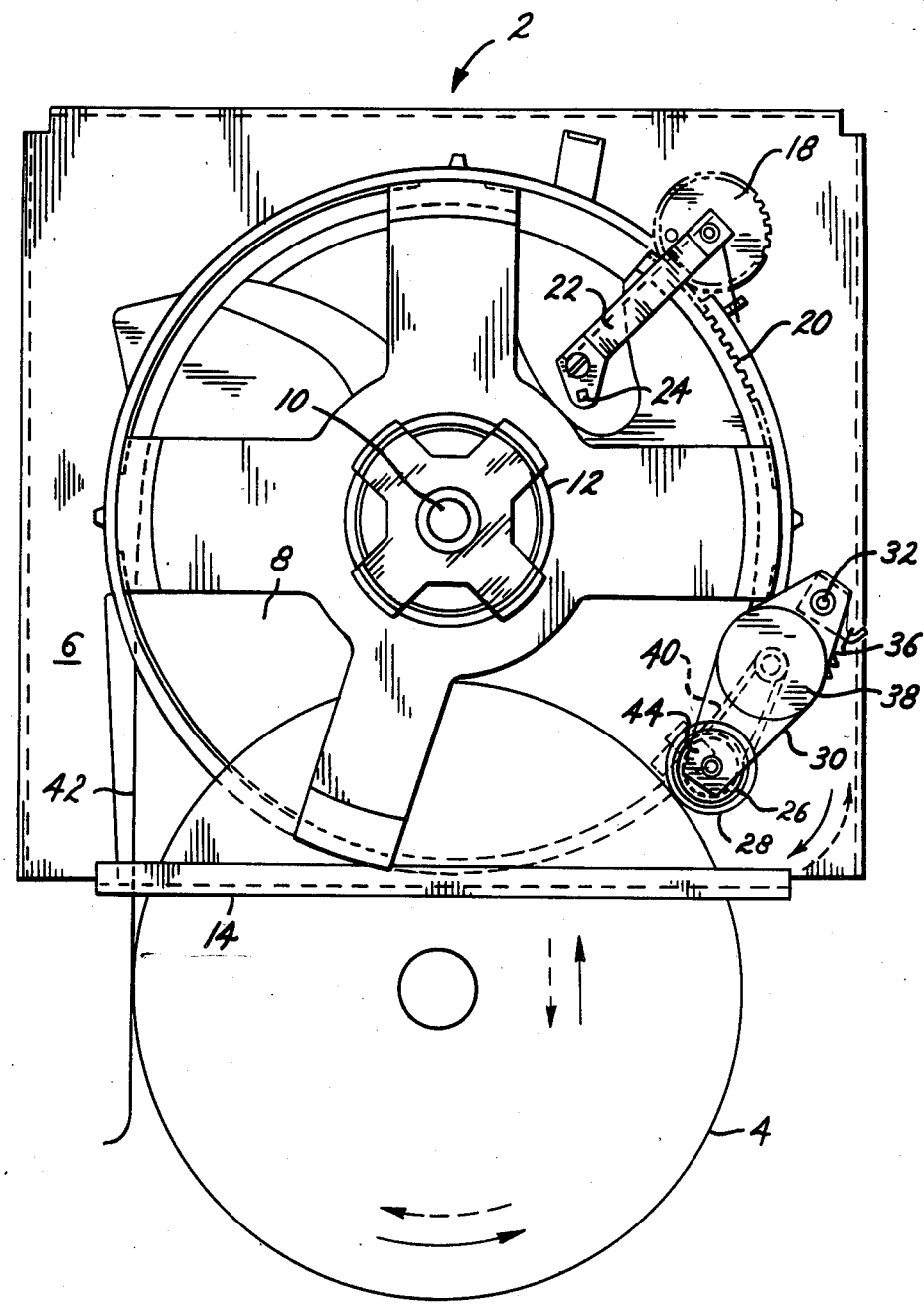
FIG. 2 is a view similar to FIG. 1 illustrating the apparatus with a disc partially within the apparatus during either a loading or an unloading operation.

In accordance with the invention, to assist in the loading (and unloading) operation, a power-driven roller 26 is provided to first engage the edge of the disc 4 when it is partially inserted in the position shown in FIG. 2 and to positively rotate the disc 4, thereby rolling the disc 4 against a diametrically opposite surface so as to load the disc 4 into the apparatus 2. Heretofore, a roller 26 has been provided to engage the edge of the disc 4 as it is inserted but the roller 26 has been an idler and freely rotatable. In keeping with the present invention, the idler roller is replaced by the power-driven roller 26, and the surface 28 of the power-driven roller is covered with a material preferably resilient and having a high coefficient of friction, such as rubber. This provides an aggressive surface against the edge of the disc 4 so that, upon operation of the power-driven roller 26, the disc 4 is positively rolled along the diametrically opposite surface. In this case, the power-driven roller 26 is mounted on a pivotally supported lever 30 which pivots around a pin 32 fixed to a frame or housing 6. A spring 36 urges the lever 30 in a clockwise direction to maintain the power-driven roller 26 against the edge of the disc 4.

The power-driven roller 26 is rotated by a miniature electrically-powered motor 38 which is mounted on the supporting lever 30, and the roller 26 is connected by a belt 40 to the motor 38 so that the roller 26 is power-driven.

In the preferred embodiment of the invention illustrated in FIGS. 1 and 2, diametrically opposite the power-driven roller 26, wall 42 is also covered with a material, such as rubber, possessing a high coefficient of friction for engagement by the edge of the disc. If it is desired, as in the case of an automatic changer apparatus, to transfer a disc 4 from the player apparatus 2 to a storage magazine, the wall 42 can be extended from the player apparatus 2 to the adjoining storage unit in which the discs are stored and with which the automatic changer is provided.

When a disc 4 is inserted manually or automatically and brought into contact with the powerdriven roller 26, inward movement of the edge of the disc tends to pivot the supporting lever 30 counterclockwise (FIG. 2). This slight pivoting movement operates a switch 44 which, installed in the power supply circuit of the motor 38 for the power-driven roller, switches the motor 38 "ON" to cause it to rotate clockwise. The power-driven roller 26, also driven clockwise, causes the disc 4 to be displaced and drawn loaded inwardly within the housing 6 by rolling the disc 4 against the diametrically opposite surface provided by the wall 42.

Figure 3:
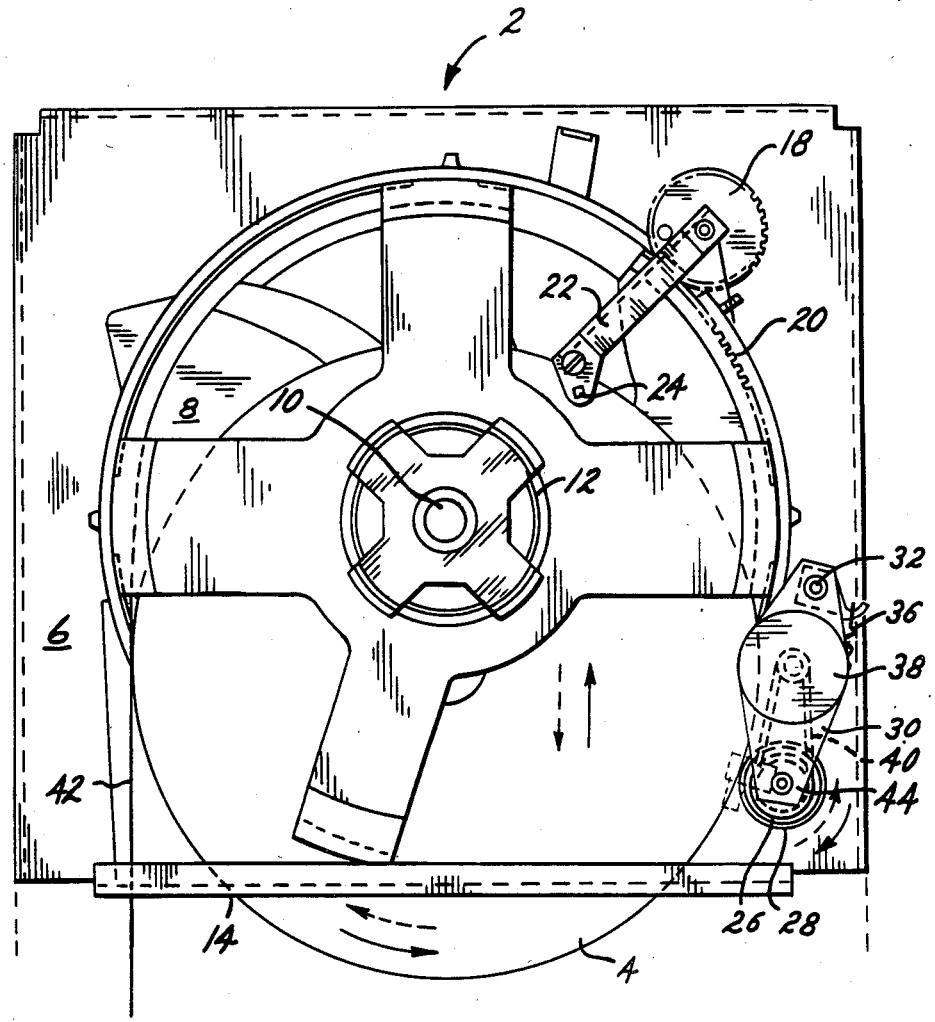
FIG. 3 is a view similar to FIG. 1 illustrating the apparatus with a disc further inside the apparatus, as compared with FIG. 2, during either the loading or unloading operation.
Figure 4:
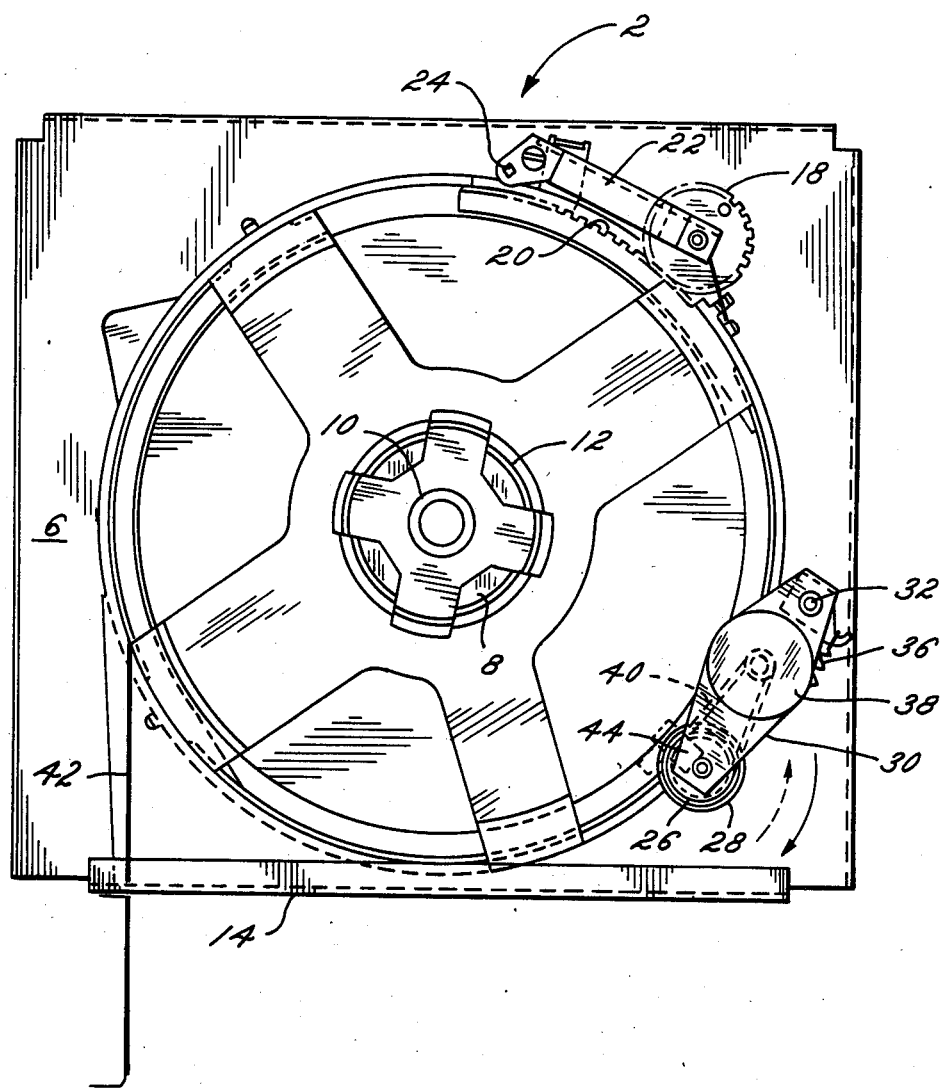
FIG. 4 is a view similar to FIG. 1 illustrating the apparatus with a disc in the operating position.
Figure 5:
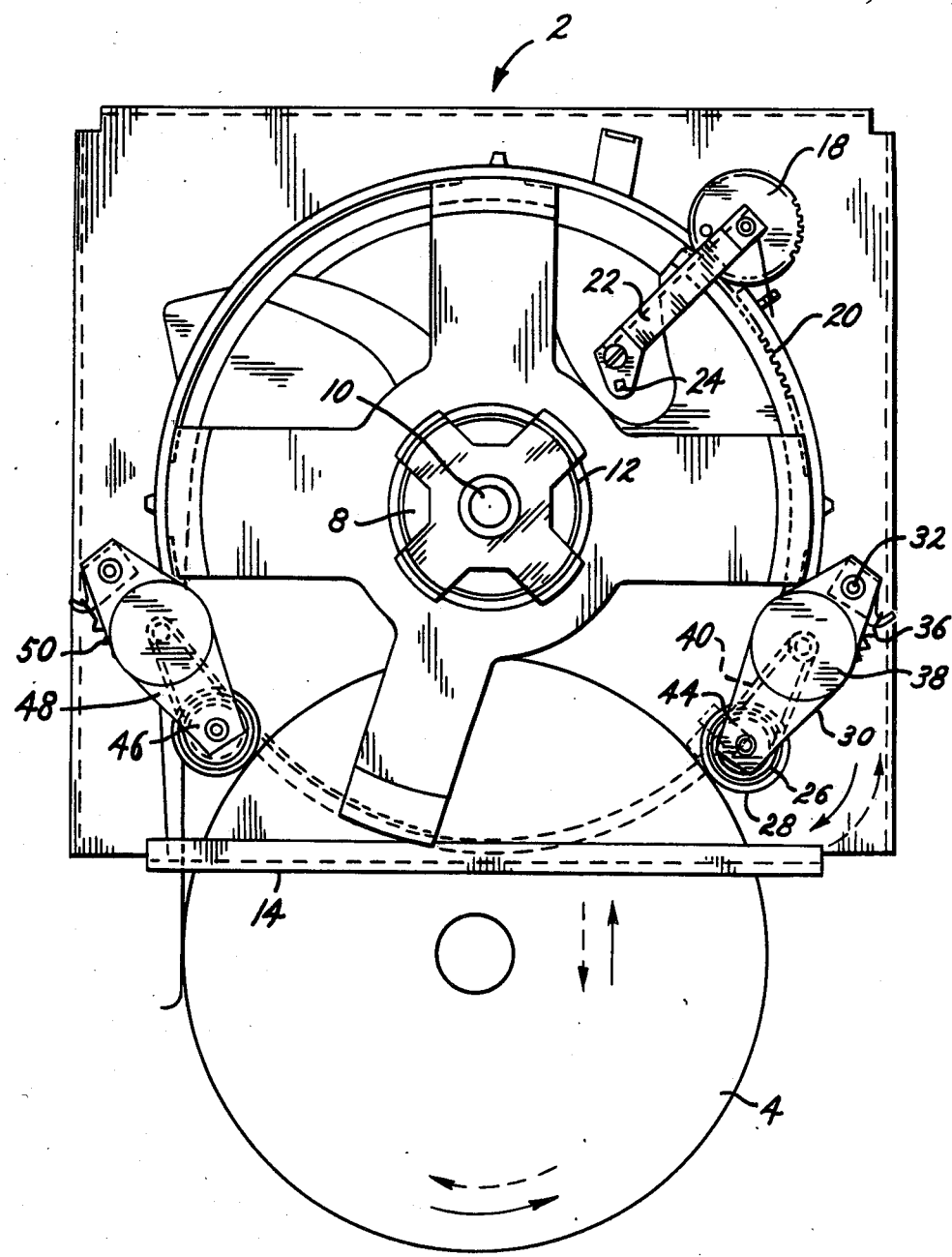
FIG. 5 is a view similar to FIG. 1 illustrating an alternative embodiment of the invention with dual power-driven rollers for assisting in the loading and unloading operations.
Figure 6:
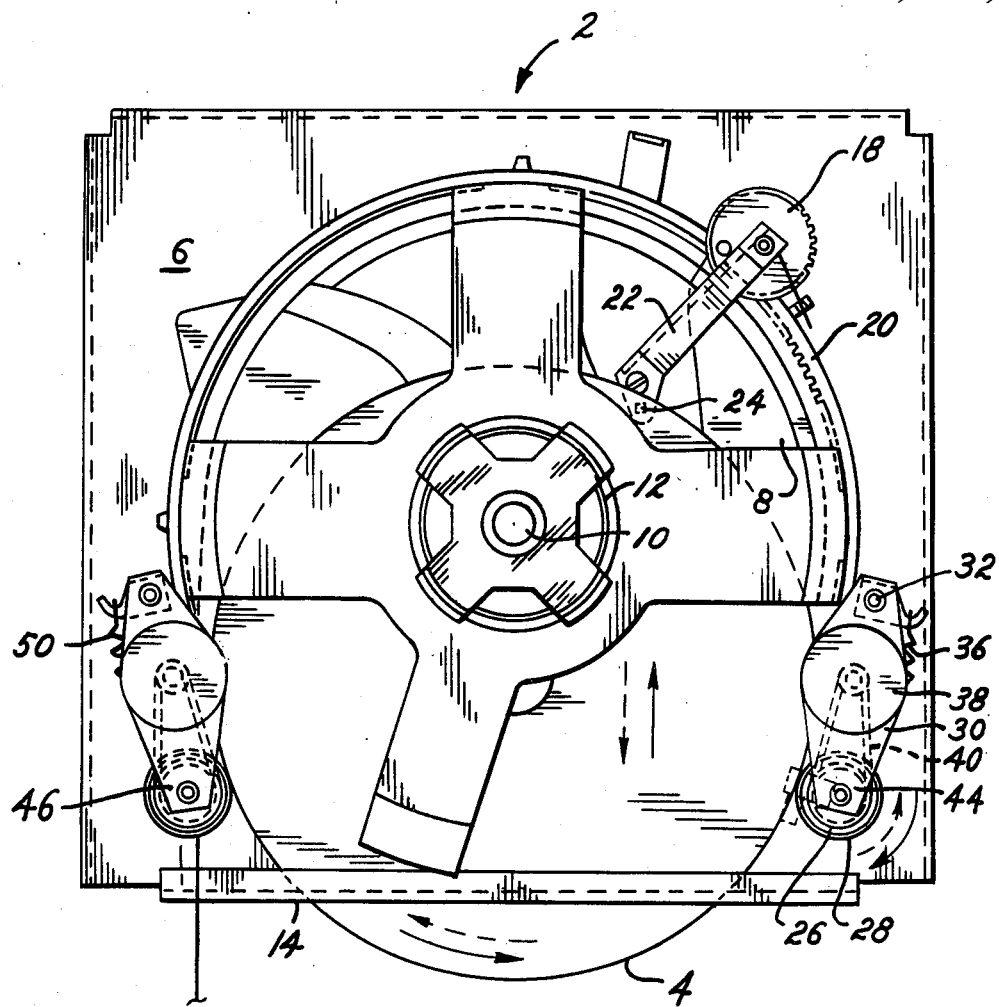
FIG. 6 is a view similar to FIG. 5 illustrating a disc further within the apparatus, as compared with the FIG. 5.

The disc 4 is drawn by the power-driven roller 26 partially within the apparatus 2 to the position shown in FIG. 3. In the course of that movement, the edge of the disc crosses the axis of an optical detector 24, which is carried by the end of the guide arm 22, and the optical detector 24, through a control circuit, upon detection of the insertion of the disc 4 causes the motor for driving the gear wheel 18 to be switched "ON". The remaining required inward movement of the disc 4 to a position concentric with the disc support 8 is achieved in the same manner as it has been heretofore by the force exerted by a spring 36 on the support lever 30, which tends to rotate the lever 30 clockwise and shift the disc 4 inward until it is concentric with the disc support 8 unit and fully received therein. In this portion of the disc movement, the lever 30, which carries the power-driven roller, causes it to engage the outward edge of the disc. When the disc 4 is within the disc support 8, as shown in FIG. 3, the main drive motor is switched "ON", the gear wheel 18 is rotated clockwise which, during the initial phase of its rotation, swings the guide arm 22 outwardly to the position shown in FIG. 4, allowing the support lever 30 for the power-driven roller 26 to pivot under the urging of the spring 36 and with the engagement of the disc 26 with the outward edge of the disc, causes a shift of the disc 4 to its centered position on the disc support 8. Continued rotation of the gear wheel 18 clockwise rotates the disc support 8 and, because of its helicoidal motion, the disc 4 is shifted out of the plane of its inward movement to the playing position, where it is clamped on the drive hub 10 and is ready to be rotated for recording and reproducing. At the end of the playing period and when the unloading operation is started, the motor for driving the gear wheel 18 is switched "ON" in the reverse direction by inverting the polarity of the energizing power supply, or by any equivalent means, so as to cause the motor to turn the gear wheel 18 counterclockwise. The disc support 8 is turned clockwise because of the meshing engagement of the gear wheel 18 with the gear sector 20, and the guide arm 22 is rotated counterclockwise by the gear wheel 18 to engage the edge of the disc 4 and shift it to the position of FIG. 3 where it projects partially from the housing 6. A limit switch (not shown) then cuts the power supply to the motor operating the gear wheel 18 and switches on the motor 38 for the power-driven roller 26 in a direction to rotate the power-driven roller 26 counterclockwise. The power-driven roller 26, first engages the outward edge of the disc and rotates the disc in cooperation with the diametrically opposite surface 42, and displaces the disc 4 to unload the disc in a direction outwardly of the housing 6. The roller 26 subsequently engages the inward edge of the disc, as shown in FIG. 2, and, thus, the disc 4 is displaced outwardly to the position shown in FIG. 2. This disc displacement, provided by rotation of the power-driven roller 26, allows easier handling of the disc 4, and the disc 4 can then be returned to a separate storage magazine or may be removed manually.

In the case of equipment which is front-loading, as used in vehicles or in the home, in which the disc 4 is inserted through a slot 14 in a housing 6, a two-phase ejection may be provided, the first phase displacing the disc 4 to its usual ejection (stable position) as shown in FIG. 3, the second phase operated by a timer or by an additional button taking the disc to a further projecting position, as shown in FIG. 2, where it can be returned to a magazine used, for example, for storage.

According to a further embodiment of the invention, rather than providing a wall 42 covered by rubber to provide a cooperating diametrically opposite surface to the power-driven roller 26, one or several additional rollers, herein shown as a single power-driven roller 46, may be provided symmetrical with respect to the first power-driven roller 26 to provide for disc displacement to assist in loading and unloading the player apparatus 2. Preferably, the second power-driven roller 46 is mounted on a pivoting lever 48 subject to the action of a resilient spring 50, as shown. It should be noted that the player apparatus 2 constructed according to this invention works equally well in the horizontal or vertical positions and is, therefore, unaffected by the angle of the slope of the equipment, which is particularly important in mobile applications such as equipment mounted in vehicles. With the single or double power-driven roller arrangements, the disc 4 is positively engaged and drawn into the apparatus 2 and positively withdrawn from the apparatus 2 during the unloading operation so that the disc 4 is positively moved in all phases of its loading and unloading.

We claim:

1. A power-driven device for assisting the loading and unloading operations of a slot-type disc player apparatus, said apparatus being mounted in a housing having an entrance slot for discs, said device comprising:

guide means in said housing engageable by the edge of the disc during rolling movement of the disc along a substantially linear path through the entrance into and out of the housing;

power-operated roller means mounted in said housing on a movable support and carried by said support to be engageable with the edge of the disc generally diametrically opposite the edge engaging said guide means, said roller means having an aggressive surface engageable with both the inward and outward edges of the disc; and bidirectional drive means including a motor connected to drive said roller means in both directions to positively rotate the disc by engagement first with the inward edge thereof and subsequently with the outward edge thereof to cause rolling movement thereof along said guide means to load the disc into the apparatus in one direction of rotation and, first with the outward edge thereof and subsequently with the inward edge thereof to cause rolling movement thereof along said guide means, to unload the disc out of the apparatus in the other direction of rotation.

2. A power driven device according to claim 1 wherein said guide means provides a linear surface engageable by the edge of the disc.

3. A power-driven device according to claim 1 wherein said guide means includes a second roller means movably mounted in said housing symmetrical with said power-operated roller means with reference to the center line of the entrance path of the disc.

4. A power-driven device according to claim 3 including a motor for power-driving said second roller means.

5. A power-driven device according to claim 1 wherein said movable support for said power-operated roller means includes a lever and spring means acting on said lever to urge said power-driven roller means into contact with the edge of the disc.

6. A power-driven device according to claim 5 wherein said motor for driving said power-operated roller means is mounted on said lever.

7. A power-driven device according to claim 1 further including detection means mounted in said housing for detecting the presence of the disc during insertion into the apparatus through the entrance slot, and control means for starting, stopping and selecting the direction of rotation of said bidirectional drive means in response to the presence of the disc detected by said detecting means.

* * * * *